United States Patent Office 3,709,987
Patented Jan. 9, 1973

3,709,987
MEDICATED FEED SUPPLEMENT FOR
TREATING CATTLE
Paul M. Williams, Spring Brook Farm, Rte. 2,
Troy, Ohio 45373
No Drawing. Continuation-in-part of application Ser. No. 572,886, Aug. 17, 1967. This application Oct. 6, 1969, Ser. No. 864,180
Int. Cl. A61k 27/00
U.S. Cl. 424—128                           10 Claims

ABSTRACT OF THE DISCLOSURE

The diseases of milk fever and acetonemia or ketosis in dairy cattle are prevented by feeding to the cattle a feed supplement including dicalcium phosphate, trace mineralized salt and copper sulfate combined at a weight ratio of approximately 1:1:.015, respectively. The supplement is mixed into a base feed mixture of grain products including corn, oats, bran and soybean meal so that the supplement is approximately 2% by weight, of the combined mixture. The supplement may also be used directly for the treatment of ketosis in a drenching procedure.

BACKGROUND OF THE INVENTION

This invention relates to feed for cattle, and more particularly, to an improved method and supplement adapted to be used in feeding cattle for preventing certain diseases in the cattle. This application is a continuation-in-part of my application Ser. No. 572,886, filed Aug. 17, 1966, now abandoned.

The invention is specifically directed to the prevention of cattle diseases known as milk fever (parturient paresis) and acetonemia (also known as ketosis). These two diseases are well known to dairy farmers and veterinarians and commonly occur at or near calving time. Usually if the animals are not treated immediately, they will die within a few hours.

Milk fever is believed to be caused by a disturbance of the calcium balance in the blood, and commonly the first symptoms are noticed from twelve to seventy-two hours after calving. The fresh cow usually appears dull, has a drop in temperature, and soon is unable to support its weight, especially on the hind limbs. When the cow is down, the head is usually turned back against the side, and often the cow loses consciousness. It has also been observed that the cows affected with milk fever usually are superior milk producing cows.

Although the exact cause is not known, but one abnormality which appears is acute hypocalcemia manifest by a serum calcium level of 3 to 7 mg. percent, usually averaging about 5 mg. percent. The normal serum calcium level is 9% to 10%. This disease is common in cows of 5 to 9 years old but may occur in any cow, and the Jersey breed seems to have a higher incidence than other breeds. It has been proposed that cows be given massive doses of Vitamin D five to seven days before parturition. This latter method is not at all reliable because if stopped more than four days before calving, the cow remains susceptible, and if continued for longer than seven-eight days there is a danger of toxicity. I.V. injection of large amounts of vitamin $D_3$ have also been used two-eight days before calving but some animals exhibit a sharp reaction to I.V. injection. Another method used is the feeding of high phosphorus low calcium foods but if extended over long periods sometimes results in depletion of skeletal mineral resins.

Acetonemia or ketosis is most frequently observed within the first six to ten weeks after calving. It is believed to be in part caused by the removal of sugars from the cow's blood and, or an imbalance of calcium-phosphorus ratio as a result of pregnancy and the drain of heavy milk production. A cow affected with acetonemia usually goes off feed, becomes depressed and often stands alone. Constipation is frequently observed, and the odor of acetone can usually be detected from the breath. The cow may tremble or slobber or go blind and stagger around in a circle or even attempt to climb the side of the barn. It has also been observed that frequently the cows affected with milk fever subsequently become affected with acetonemia, suggesting that the calcium-phosphorus ratio imbalance is a definite factor. In addition, the onslaught of acetonemia is often very sudden, and once a cow has had an attack, there is a severe drop in its milk production which is virtually never made up during that lactation period.

While both carbohydrate deficiency and relative adrenal insufficiency have been considered in the etiology of ketosis, it is presently felt that carbohydrate metabolism is more likely the origin of the trouble. The principal source of energy for cattle are acids such as acetic, proprionic and butyric produced in connection with microbial fermentation. Of these, proprionic acid is generally accepted as the precursor having antiketogenic properties. A defeat in metabolism which precludes carbohydrate intake or intake of the precursors generally leads to ketosis. It has been suggested that animals be fed materials high in proprionic acid for a few weeks before and after calving. Such materials include pellitized alfalfa hay, and flaked corn, or barley, but to be effective, long hay, straw, should not be fed. In some cases feed has been supplemented by the addition of sodium proprionate.

The treatment of animals stricken with ketosis involves I.V. injection with 50% glucose solution and one of the following: (a) oral administration of propylene glycol or injection of glucocorticoids.

It is also known that minerals play an important part in metabolism and enzyme function. For example, these minerals are needed for growth and additional minerals are needed dependent upon rate of milk production. Where a dairy cow is near, or shortly after calving there is still further need for close control of minerals in addition to those needed for growth, maintenance of milk production, and to satisfy the depletion caused by calving.

It has been reported, for example, that a mature cow of between 1100 and 1750 pounds weight needs between 14 to 22 grams of calcium and phosphorus just to maintain normal rate of growth. Where the cow produces between 44 and 77 pounds of milk per day, the additional need for calcium and phosphorus increases by an additional 2–3 grams of each depending upon the fat content of the milk. Thus, the normal dietary supplements designed to maintain growth and milk production will not suffice if additional minerals are needed. In the main, calcium and phosphorus are present in the usual feeds, in varying amounts depending upon the feed. For example, alfalfa hay contains 1.2% calcium and 0.20% phosphorus, clover hay is slightly higher in calcium. Wheat bran, on the other hand, is high in phosphorus (1.17%) but low in calcium (.14%), the above percentages being average percentages. Thus, the usual feeds satisfy the need for some trace minerals to maintain growth and perhaps milk production. Notwithstanding the fact that these are the so-called common feeds, the problem of ketosis and milk fever still exist.

It is known from the prior art to use various supplements for the purpose of promoting growth, see for example U.S. Pat. No. 2,973,265 of Feb. 28, 1961. This patent suggests a supplement containing trace minerals and in which a calcium compound is added to provide a $CaO/P_2O_5$ molecular ratio of between 0.9 and 3.0:1. Conversion of this to a weight ratio indicates a range of 50.5 grams to 168 grams of CaO for each 142 grams of $P_2O_5$, a ratio on a weight basis of from about 35:1 to 1.18:1. If calculated on a weight basis of Ca and P above, the range is about 37.9 to 107 grams for each 62 grams of phosphorus, or a weight ratio of between about .61:1 to 1.73:1. More important, however, is the absence of any disclosure that milk fever or ketosis can be prevented by maintaining the balance of calcium and phosphorus in the blood in the range of not less than about 1:1 and not greater than about 2:1.

Accordingly, those supplements designed to maintain growth and milk production are not known to be effective where additional nutrients are needed to maintain healthy disease free cattle. This is particularly true where there is a heavy demand for these additional nutrients due to calving or increased lactation, the very situation in which ketosis and milk fever occur.

SUMMARY OF THE INVENTION

The present invention is directed to an improved feed mixture which is produced by adding a novel supplement thereto and which has been found highly effective in preventing milk fever and acetonemia when the mixture is fed to cattle on a regular basis. In addition, it has been found that the feed mixture of the present invention is effective in eliminating cases of retained placentas in fresh cows.

Accordingly, it is a primary object of the present invention to provide an improved cattle feed which is effective for preventing diseases in fresh cows.

Another object of the invention is to provide a novel method for preventing milk fever and acetonemia in cattle.

Still another object of the invention is to provide an improved cattle feed supplement which can be easily produced and mixed with the feed by either a dairy farmer or a grain elevator.

A further object of the invention is to provide a novel dairy cattle feed which is effective in preventing milk fever and acetonemia, and thereby in preventing the resulting losses in milk production, without significantly increasing the cost of the feed.

DETAILED DESCRIPTION OF THE INVENTION

The cattle feed supplement of the present invention, which has proved highly effective in eliminating the diseases of milk fever and acetonemia, is preferably admixed with a base mixture of ground ear corn and oats mixed together with bran and soybean meal. Other base mixtures may be used, for example, ground shelled corn, dry molasses, soybean meal, and linseed meal, or feeds such as millrun, rolled barley, oats, corn, beet pulp, cottonseed meal, corn silage or hayalage. Other silage materials which may be used include alfalfa, clover, sudan grass, sweet sorghum, dried citrus pulp, barley, corn cob meal, wheat bran, dried brewers grain, and the like, and mixtures thereof. The particular base mixture used may vary widely in components and ratio of components as will be apparent to those skilled in the art, and generally provide those materials needed for normal metabolic function of growth and good milk production. It is important in accordance with the present invention that a base mixture be used as a vehicle through which the supplement is dispersed thereby assuring uniform distribution of the supplement and assuring that the cattle will consume the base mixture and supplement.

To this base mixture are added trace mineralized salts, copper sulfate, and a calcium phosphate such as dicalcium phosphate, all of which are uniformly dispersed throughout the base mixture. The phosphate, salt and copper sulfate may be mixed together in advance to form a supplement which can be subsequently mixed to the base mixture.

The copper sulfate is added in the form of cupric sulfate pentahydrate ($CuSO_4 \cdot 5H_2O$) which is also known as blue vitriol or chalconthite.

The trace mineralized salt is a common product available from various suppliers under different trade names and generally includes between 90% and 99.00 sodium chloride with controlled minor amounts of other ingredients such as:

|  | Not less than about (percent) |
|---|---|
| Manganese | 0.200 |
| Iron | 0.160 |
| Copper | 0.033 |
| Cobalt | 0.010 |
| Iodine | 0.007 |
| Zinc | 0.005 |

The amount of trace minerals may vary from the above analysis, but all of the trace mineralized salts usable in accordance with the present invention are characterized by between 1% and 10% of trace minerals, for example, as listed above, the balance being sodium chloride. The trace minerals may be present as manganese oxide, ferrous carbonate, copper oxide, calcium iodate, zinc oxide, and the like.

The dicalcium phosphate includes between 19% and 28% calcium and 18% to 24% phosphorus, and one typical example of a cattle feed grade includes between 19% and 23%±4% calcium, a minimum phosphorus content of 18%±4%, inert carriers and trace amounts of fluorine, e.g., less than 0.20%.

Trace mineralized salt is designed to assure the minimum minerals for growth and milk products. It is reported that salt, calcium, phosphorus, iron, iodine, cobalt and copper are definitely needed. Specifically, copper is needed as an activator for the enzymes related to hemoglobin synthesis and more of this is needed than cobalt. Copper is usually needed in an amount of 50 mg./day and usually available from forage, the latter containing about 5 p.p.m. Iodine is used to prevent goiter and usually fed in the form of iodized salt containing about .007% iodine. Calcium and phosphorus are usually fed in the ratio of 1:1 for growth and 1.4:1 for milk production.

Yet, where abnormal situations occur such as ketosis or milk fever, the usual nutritional feeds, e.g., silage, etc. and even those supplemented with the growth and milk supplements may not satisfy the need for additional amounts of calcium, phosphorus and copper to overcome the imbalance which is believed to give rise to these diseases. Thus, the supplement of the present invention, in addition to providing the minerals needed for growth and milk production also provides simultaneously the added minerals believed needed in those periods in which abnormal imbalances are likely to occur, i.e., before and after calving.

The feed supplement is added to a base mixture in an amount of 30 to 60 pounds of supplement per ton of base mixture, and particularly effective results have been achieved on the basis of 40 pounds of supplement per ton of feed. While the exact reason is not known, the presence of cupric sulfate in addition to trace mineralized salt and dicalcium phosphate operates more effectively than the latter two alone. The reason for this synergism may, in part, be due to some aspect of the metabolism which permits more rapid assimilation of the calcium and phosphorus in order to achieve a proper balance of these minerals in cattle as determined by blood analysis, or it may be in part due to the function of copper as an enzyme activator in hemoglobin synthesis, melanin production, and functional integrity of the bone structure both of the calf and the cow during the period prior to calving and shortly thereafter. For example, blood samples of dairy cattle regularly fed the supplement of the present invention were analyzed for calcium and phosphorus, and the results were as follows:

| Sample: | Calcium, mg./100 ml. | Phosphorus, mg./100 ml. | Calcium-phosphorus ratio |
|---|---|---|---|
| 1 | 10.2 | 5.8 | 1.75:1 |
| 2 | 9.4 | 6.6 | 1.42:1 |
| 3 | 9.6 | 7.0 | 1.37:1 |
| 4 | 9.6 | 6.2 | 1.54:1 |
| 5 | 8.3 | 6.0 | 1.38:1 |
| 6 | 9.6 | 5.8 | 1.65:1 |
| 7 | 10.2 | 5.6 | 1.82:1 |
| 8 | 9.6 | 5.4 | 1.77:1 |
| 9 | 8.7 | 6.0 | 1.45:1 |
| 10 | 9.4 | 7.0 | 1.34:1 |
| 11 | 8.7 | 6.0 | 1.45:1 |
| 12 | 8.3 | 5.9 | 1.40:1 |

The cattle in the above test were fed a base mixture including the supplement of the present invention present in an amount of 40 pounds of supplement per ton of base mixture, the latter including corn, oats, bran and soybean meal. The base mixture and supplement was fed on the basis of one pound of feed mixture and supplement per 3½ pounds of milk product although the rate may be one pound of feed-supplement mixture per 2 to 5 pounds of milk product. Each cow produced an average of 40 pounds of milk per day and was fed between 10 and 14 pounds of feed mixture and supplement. For example, at this rate of consumption the cattle receives 60 to 80 mg. of copper over and above that present in the trace mineralized salt, and a substantially increased amount of calcium and phosphorus over that normally present in the base mixture. In no case did mlik fever or ketosis develop as long as the supplement of the present invention was led on a regular basis in a base mixture.

The above data are significant in that the calcium-phosphorus ratio was above 1:1 and below 2:1. In instances in which a proper balance of calcium-phosphorus in the ratio of 1:1 to 2:1 was maintained in the blood, there were few, if any, instances of milk fever or ketosis. When the ratio dropped below 1:1, e.g., .95:1, eight of the seventeen cows developed milk fever. Conversely, above a ratio of 2:1 of calcium-phosphorus, the cows exhibited an increased susceptibility toward ketosis, and/or milk fever. Thus, by maintaining the proper balance of calcium and phosphorus in the blood, ketosis and milk fever are prevented. The evidence thus far seems to suggest that milk fever is probably due to a lack of calcium while ketosis is probably due to an excess of calcium or a shortage of phosphorus probably due to the heavy disproportionate demands for these minerals at or near calving time.

Thus, the feed supplement of the present invention is designed to maintain a proper balance of calcium and phosphorus notwithstanding the heavy demands for these minerals at or near calving time. This is achieved by the use of a calcium-phosphorus material in which the percentage of calcium is greater than the percentage of phosphorus, but not significantly greater than twice the percentage thereof. By using the cupric sulfate, the assimilation of calcium and phosphorus into the blood of dairy cattle seems to be enhanced. It is also desirable to use the trace mineralized salt since the supplement seems to work better and results are more effective, although the underlying reason is not known and may perhaps be attributable to some metabolic function in dairy cattle or because a proper balance of other minerals is also maintained. Whatever the reason, it is important, in accordance with the present invention to use a supplement, on a regular basis, so constituted to achieve and maintain a calcium-phosphorus ratio in the blood in the range of not less than about 1:1 and not greater than about 2:1.

In accordance with one successful experiment, the above ingredients were mixed in accordance with the following composition:

Ingredient:
  Ear corn _____lbs.___ 1200
  Oats _____lbs.___ 400
  Bran _____lbs.___ 200
  Soybean meal _____lbs.___ 200
  Dicalcium phosphate _____lbs.___ 20
  Trace mineralized salt _____lbs.___ 20
  Copper (cupric) sulfate _____oz.___ 5

That is, to each ton of base feed mixture of corn, oats, bran and soybean meal are added twenty pounds of dicalcium phosphate, twenty pounds of trace mineralized salt and five ounces of cupric sulfate. Thus the weight ratio of dicalcium phosphate or salt to copper sulfate is approximately 65:1, although ratios as high as 300 to 1 and as low as 50 to 1 may be used.

A feed mixture having the above composition was fed to a dairy cattle herd of approximately 30 milk cows for a test period of about one year. During this period, there was not one case of a cow having either milk fever, acetonemia or a retained placenta at calving time. On the other hand, prior to the adding of calcium phosphate, trace mineralized salt and cupric sulfate to the base mixture, it was not uncommon for at least forty to fifty percent of the fresh cows in the herd to be affected in some degree with at least one of the diseases or a retained placenta. It is not clearly understood why the above feed mixture has proven effective in eliminating diseases of milk fever and acetonemia in the dairy cattle, but it is believed that the cupric sulfate and calcium phosphate are essential ingredients, and the cupric sulfate has an action in establishing proper balance of calcium and phosphorus in the cow's bloodstream.

In another test a herd of twenty-nine pure breed Jerseys in which about 20% had milk fever diagnosed as such by a veterinarian, the herd was fed the supplement in accordance with the present invention on the basis of forty pounds of supplement per ton of feed on a regular basis. Retained placentas were greatly reduced and milk fever appreciably reduced, if not eliminated.

In still another test, a herd of thirty-five Holsteins, of which fifteen had diagnosed ketosis were fed a base feed of 1900 pounds shelled corn, 400 pounds soybean meal, 100 pounds linseed meal, 200 pounds dry molasses, 400 pounds of oats and 40 pounds of supplement/ton of base feed. The herd was free of ketosis and the percentage of retained placentas dropped to less than 10%.

It is preferred in accordance with this invention that equal amounts of trace mineralized salt and dicalcium phosphate be used, although other ratios will be apparent to those skilled in the art. In any event, both the phosphate and the cupric sulfate should be present in an amount sufficient to bring the balance of calcium and phosphorus in the blood to a level of between 1:1 to 2:1 and to maintain it at that level. Optimum results, in accordance with this invention are achieved by use of trace mineralized salt in addition to the phosphate and sulfate.

It has also been observed in accordance with the present invention that the supplement alone is effective in treating ketosis directly by a drenching technique, i.e., forced feeding of the supplement. In accordance with this procedure, one pound of supplement is dispersed in one quart of water and administered twice daily. In a few days of treatment this way, dairy cattle have recovered from ketosis.

One important advantage of the cattle feed of the invention is that none of the ingredients require a chemical reaction but can be conveniently mixed together in a suitable mixing chamber. That is, the small percentage of dicalcium phosphate, salt and cupric sulfate may be added in a dry powder form and can be uniformly dispersed throughout the base feed mixture by thoroughly mixing the ingredients with the base feed mixture. Furthermore, the cost of the small percentage of dicalcium phosphate, salt and cupric sulfate is practically insignifican when compared with the cost of the base mixture and thus does not appreciably increase the cost of the cattle feed, especially when considered in conjunction with the resulting maintenance of milk production and minimizing expense for veterinarian and medicine.

While the supplement and feed mixture and method for preventing milk fever and acetonemia as herein described constitute preferred embodiments of the invention, it is to be understood that the invention is not limited to these precise materials and methods, and that changes may be made therein without departing from the scope of the invention.

What is claimed is:

1. An improved supplement for addition to a base feed mixture to be used with dairy cattle for the prevention of ketosis and milk fever and for use directly in the treatment of ketosis comprising as the essential ingredients trace mineralized salt, copper sulfate and dicalcium phosphate, said trace mineralized salt including between 90 and 99% sodium chloride and the balance being trace minerals, said dicalcium phosphate including calcium to phosphorus in the ratio between about 1:1 to 2:1, and said dicalcium phosphate and trace mineralized salt being present in approximately equal amounts and each in the ratio of between 50 to 300 times the weight of said copper sulfate.

2. The supplement as set forth in claim 1 wherein said decalcium phosphate and trace mineralized salt are present in an amount by weight of 20 pounds for each 20 pounds of dicalcium phosphate, and said cupric sulfate being present in an amount of five ounces per twenty pounds of dicalcium phosphate.

3. The supplement as set forth in claim 1 in combination with a base feed mixture for dairy cattle wherein said supplement is uniformly dispersed in said feed mixture and present in an amount of between 30 to 60 pounds per ton of base feed mixture.

4. The supplement as set forth in claim 2 in combination with a base feed mixture for dairy cattle wherein said supplement is uniformly dispersed in said feed mixture and present in an amount of between 30 to 60 pounds per ton of base feed mixture.

5. The supplement as set forth in claim 2 in combination with a base feed mixture for dairy cattle, wherein said supplement is uniformly dispersed in said feed mixture and present in an amount of 40 pounds of supplement per ton of feed.

6. A method of preventing ketosis and milk fever in dairy cattle of calf-bearing age and prone to the diseases of ketosis and milk fever, wherein said cattle are fed a base feed mixture at regular intervals, comprising adding to said base feed mixture a supplement including as the essential ingredients dicalcium phosphate, copper sulfate and trace mineralized salt to form a supplement feed mixture, said dicalcium phosphate having a calcium to phosphorus ratio of between about 1:1 to 2:1, said supplement being present in said base feed mixture in an amount between 30 to 60 pounds per ton of base feed mixture, said dicalcium phosphate and trace mineralized salt each being present in the ratio of between 50 to 300 times the weight of said copper sulfate, and feeding said supplement feed mixture to said cattle on a daily basis and in an amount sufficient to establish and maintain a calcium phosphorus ratio in the cattle blood of between 1:1 to 2:1.

7. A method as set forth in claim 6 wherein said supplement is present in an amount of 40 pounds per ton of base feed mixture.

8. A method as set forth in claim 6 wherein said feed rate is one pound of supplement feed mixture per 2 to 5 pounds of milk produced.

9. A method as set forth in claim 7 wherein said feed rate is one pound of feed supplement per 3½ pounds of milk produced.

10. A method as set forth in claim 6 wherein said base feed mixture is selected from the group consisting of corn, oats, bran, soybean meal, dry molasses, linseed meal, millrun, rolled barley, beet pulp, cottonseed meal, alfalfa, clover, sudan grass, sweet sorghum, dried citrus pulp, barley, corn cob meal, wheat bran, and mixtures thereof.

References Cited

UNITED STATES PATENTS

| | | | |
|---|---|---|---|
| 2,997,393 | 8/1961 | Schmidt | 99—2 |
| 2,929,712 | 3/1960 | Johnson | 99—2 |

OTHER REFERENCES

Boda et al., Veterinary Bulletin vol. 24, 1954, p. 453 (Item 2867).

Milks—Practical Vel. Pharm. Materia Medica and Therapeutics (1949), p. 508.

SAM ROSEN, Primary Examiner

U.S. Cl. X.R.

424—143, 153